United States Patent [19]

MacMaster

[11] 4,207,655
[45] Jun. 17, 1980

[54] SELF-ALIGNING QUARTER-TURN FASTENER ASSEMBLY

[75] Inventor: Edward MacMaster, New Milford, N.J.

[73] Assignee: Rexnord Inc., Milwaukee, Wis.

[21] Appl. No.: 790,331

[22] Filed: Apr. 25, 1977

[51] Int. Cl.² .................. A44B 17/00; F16B 19/00
[52] U.S. Cl. ........................ 24/221 R; 24/221 K; 24/73 R; 292/62; 85/5 P
[58] Field of Search ............ 24/221 K, 221 A, 221 R, 24/73 RM; 292/62; 85/5 P

[56] References Cited

U.S. PATENT DOCUMENTS

| | | | |
|---|---|---|---|
| 83,112 | 10/1868 | Tobey | 292/62 |
| 100,505 | 3/1870 | Cook | 292/62 |
| 167,624 | 9/1875 | Share | 292/62 |
| 847,253 | 3/1907 | Iversen | 24/221 K |
| 1,298,251 | 3/1919 | Pehel | 292/62 |
| 1,326,937 | 1/1920 | Kasper | 292/62 |
| 1,603,159 | 10/1926 | Snyder | 292/62 |
| 1,798,526 | 3/1931 | Fitzgerald | 24/221 K |
| 1,956,029 | 4/1934 | Holmes | 24/221 A |
| 2,152,231 | 3/1939 | Yaneson | 24/221 A |
| 2,831,520 | 4/1958 | Clarke | 24/221 K |
| 3,709,086 | 1/1973 | Johnson | 24/221 A |
| 3,725,979 | 4/1973 | Otsuru | 24/221 R |
| 3,847,344 | 11/1974 | Kulczycki | 24/221 R |

FOREIGN PATENT DOCUMENTS

| | | | |
|---|---|---|---|
| 620962 | 3/1962 | Belgium | 24/221 K |
| 459992 | 5/1928 | Fed. Rep. of Germany | 24/221 K |
| 663635 | 8/1938 | Fed. Rep. of Germany | 292/62 |
| 1205323 | 11/1965 | Fed. Rep. of Germany | 24/221 K |
| 1142142 | 2/1969 | Fed. Rep. of Germany | 24/221 K |
| 1325043 | 3/1963 | France | 24/221 K |
| 335957 | 10/1930 | United Kingdom | 24/221 A |

Primary Examiner—Victor N. Sakran
Attorney, Agent, or Firm—Shenier & O'Connor

[57] ABSTRACT

A self-aligning, self-retracting quarter-turn fastener assembly in which one of two members to be joined rotatably supports the fastener and is provided with an elongated recess into which a crosspin intermediate the ends of the fastener shaft is urged by a spring when the fastener is in such a relative rotary position that the crosspin is aligned with an elongated slot in the member which carries the fastener receptacle. The portion of the fastener shaft extending beyond the crosspin acts as a pilot as the members are brought into cooperative relationship to ensure proper relative positioning of the members. The assembly has special utility in an installation in which a multiplicity of fastener assemblies are used.

6 Claims, 9 Drawing Figures

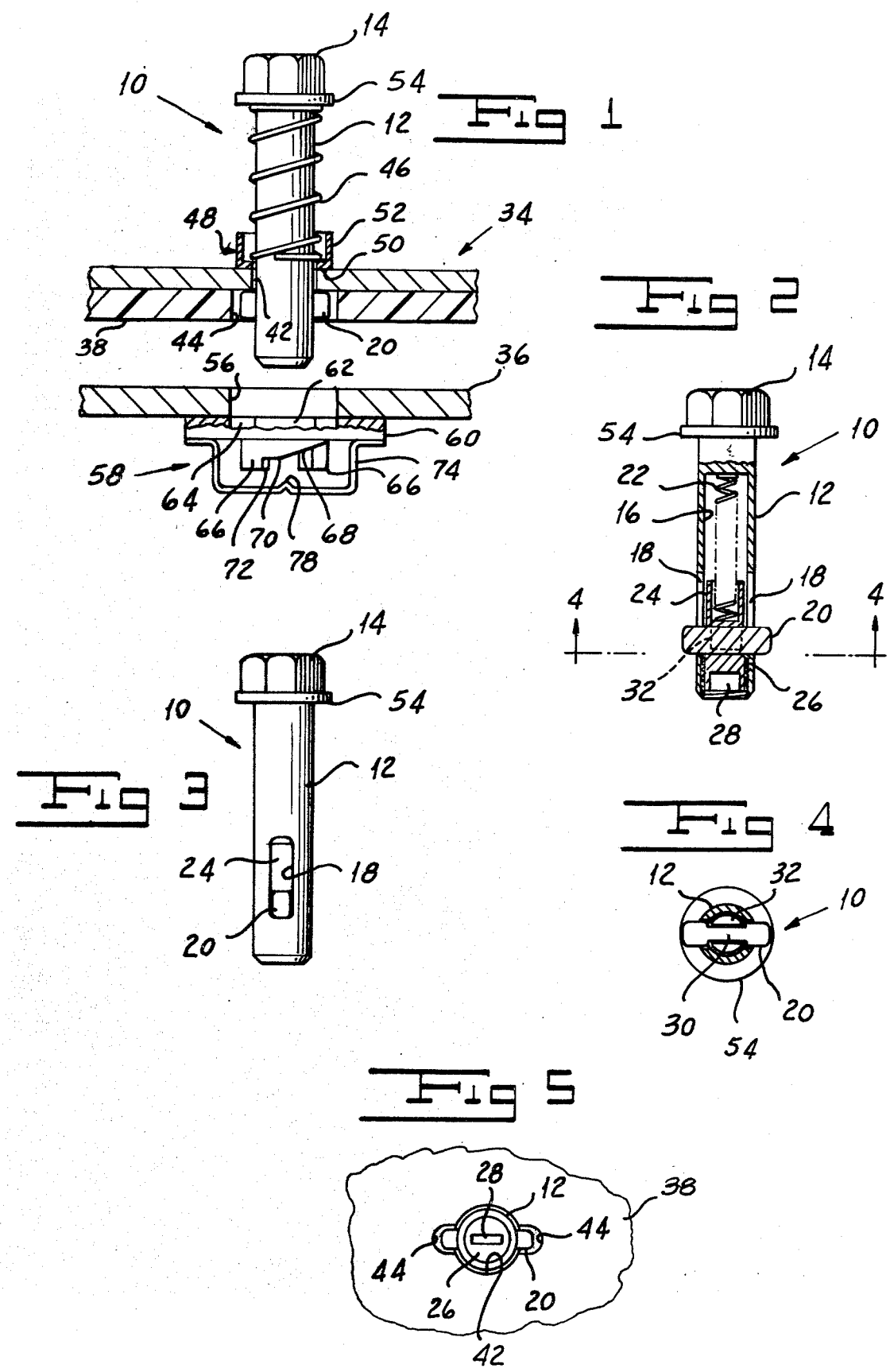

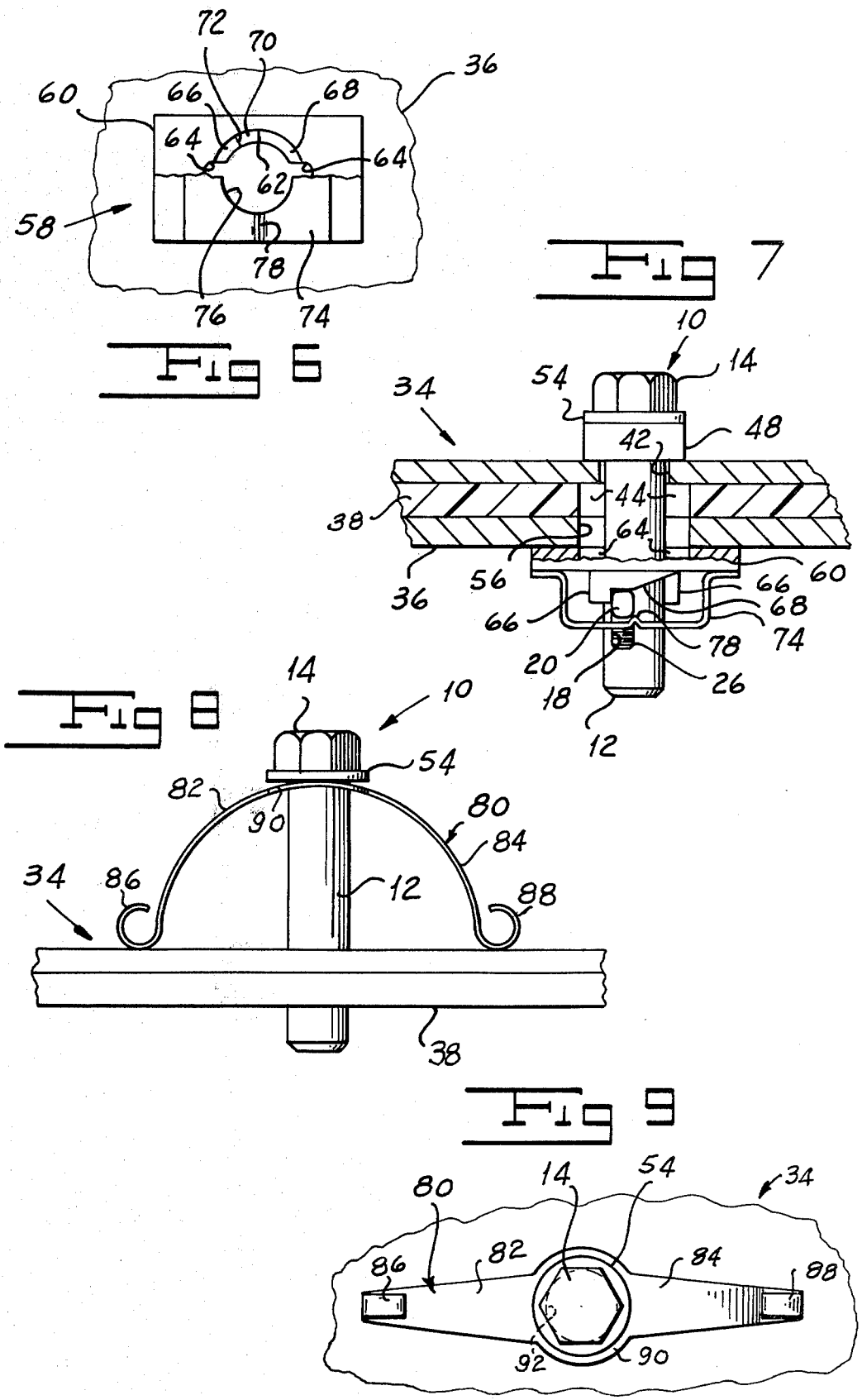

SELF-ALIGNING QUARTER-TURN FASTENER ASSEMBLY

BACKGROUND OF THE INVENTION

Quarter-turn fastener assemblies are well known in the prior art. In such fastener assemblies, one of the members to be joined rotatably supports a shaft having a head at one end and having a locking element adjacent its other end. The other of the two members to be joined is formed with a receptacle having an opening registering with an opening in the first member to permit the insertion of the shaft and locking element in one position of the shaft around the axis of rotation. From such an inserting position the shaft can be rotated so that the locking element turns to a locking position in which it is retained by the receptacle.

Quarter-turn fastener assemblies of this type have several disadvantages, one of which is their failure to provide any means for aligning the locking element prior to its insertion in the mating receptacle. Thus, fasteners which nominally act over an angle of about 90° in practice must be turned first, to align the locking element for insertion in the receptacle and, secondly, to move the locking element into a locking position after insertion in the receptacle. Another disadvantage is that the locking element may damage the mating surface or sealing gasket if the members to be joined are not in register. This problem is particularly severe in installations in which a plurality of fasteners are employed to assemble a panel on a flange opening. Another disadvantage is that the fastener elements in these assemblies do not operate correctly to position the parts to be joined, but require separate pilot pins to perform this function.

SUMMARY OF THE INVENTION

One of the objects of my invention is to provide a fastener assembly which fully retracts the fastener element to a housed position in a recess when the members are unfastened.

Another object is to provide a fastener assembly which prealigns the locking element prior to insertion in the mating receptacle.

Still another object is to provide a fastener assembly which prevents the locking element from damaging a sealing fasket or mating surface.

A further object is to provide a fastener assembly in which the fastener element may serve as a pilot pin for aligning the members to be fastened.

Yet another object of my invention is to provide a fastener assembly especially adapted for use in an installation in which a multiplicity of fasteners are required.

Other and further objects will become apparent from the following description.

In general, my invention comprises a fastener assembly in which a shaft having a head and a projecting locking element spaced from the head serves as a fastener element for releasably securing first and second members. The first member rotatably supports the shaft and is formed with a recess for receiving the locking element when oriented to a ready position at which it can be inserted through a receptacle opening in the other member. A spring biases the element axially toward the recess. The second member is provided with a locking receptacle for accepting the locking element when turned to the inserting position and then moved axially out of the recess. The receptacle retains the locking element when turned from the inserting position to a locking position. Preferably, the locking element is spaced from the shaft end so that, when the locking element is in the recess, the shaft end extends outside of the recess to serve as a guide or pilot pin.

By biasing the locking element into the recess, my fastener assembly automatically retracts the locking element when the members are unfastened, thus preventing possible damage to sealing gaskets or mating surfaces. The biasing also prealigns the locking element prior to insertion in the mating receptacle, thus providing a true quarter-turn fastener. Finally, by spacing the locking element from the shaft end so that the shaft end extends outside of the recess, I have provided a fastener assembly in which the fastener element serves as a guide pin for aligning the members to be fastened.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a fragmentary section of one embodiment of my fastener assembly with the fastener element in a retracted position.

FIG. 2 is a front elevation, shown partly in section, of the fastener of the assembly shown in FIG. 1.

FIG. 3 is a side elevation of the fastener shown in FIG. 1.

FIG. 4 is a section of the fastener shown in FIG. 1, taken along line 4—4 of FIG. 2.

FIG. 5 is a fragmentary bottom plan of the upper member of the assembly shown in FIG. 1, with the fastener in its retracted position.

FIG. 6 is a fragmentary bottom plan of the lower member of the assembly shown in FIG. 1, with the fastener removed.

FIG. 7 is a fragmentary section of the assembly shown in FIG. 1 in fastened position.

FIG. 8 is a fragmentary front elevation of an alternative embodiment of my assembly using a leaf spring.

FIG. 9 is a fragmentary top plan of the assembly shown in FIG. 8.

DETAILED DESCRIPTION OF THE PREFERRED EMBODIMENT

Referring now to FIGS. 1 to 7, the fastener of my assembly, indicated generally by the reference character 10, includes a shaft 12 having a head 14 and an axial bore 16 extending from the end remote from head 14. A pair of oppositely located slots 18 are formed in the bore wall portion of the shaft 12 at a location intermediate the head 14 and the opposite end. Slots 18 receive a crosspin 20 which serves as the locking element of the fastener 10 in a manner to be described. A spring 22 disposed within the bore 16 between its upper end and a lower retainer element 24 biases the crosspin 20 toward the lower ends of the slots 18 to a limit position determined by an adjusting screw 26 threaded into the lower end of the bore 16. A slot 28 or the like in the adjusting screw 26 permits adjustment of the limit position by means of a screwdriver. Crosspin 20 is formed with a notched center portion 30 which mates with a slotted portion 32 of the retainer 24. Crosspin 20 is thus prevented from working itself free from the fastener assembly 10.

Fastener 10 is used, for example, to fasten a first member such as a panel 34 over a second member such as a frame 36. Panel 34 is provided with a gasket 38 of any suitable material. A hole 42 extending between the two sides of panel 34 registers with an opening 56 in frame 36 rotatably to receive the shaft 12 of the fastener 10. In addition, the portion of the hole 42 formed through the gasket 38 has a recess comprising oppositely directed extensions or keyhole portions 44 for accepting the crosspin 20. The thickness of the gasket 38 is such that the crosspin 20 may be made to lie completely within the keyhole portions 44 of the hole in gasket 38. A coil spring 46 surrounding the shaft 12 extends between the head 14 and the panel 34 to bias the fastener 10 into a position in which the crosspin 20 lies completely within the keyhole portions 44 when the fastener is open and pin 20 is aligned with portions 44. Preferably, an annular retainer element indicated generally by the reference character 48 is provided to receive the lower end of the spring 46. The retainer element 48 comprises a base 50 and a cylindrical outer wall 52. A flange 54 on head 14 abuts the upper edge of wall 52 when the fastener 10 is locked. The wall 52 is of sufficient axial extent that the spring 46 lies completely with the retainer element 48 when the fastener 10 is locked.

The frame 36 is formed with an opening 56 of sufficiently large diameter to receive the fastener 10 together with the crosspin 20. A receptacle, indicated generally by the reference character 58, secured to the lower side of the frame 36 in registry with the opening 56, provides a locking means for the crosspin 20. More particularly, the receptacle 58 comprises a base 60 having a central opening 62 in registry with the opening 56 and of such a diameter to accept the shaft 12 but not the crosspin 20. The base 60 is also formed with keyhole portions 64 similar to and in alignment with the keyhole portions 44 formed in the underside of the panel 34. A pair of cam tracks 66 integrally formed on the underside of the base 60 around the central opening 62 provide camming surfaces for the crosspin 20.

Each of the cam tracks 66 has a working surface comprising an inclined portion 68 over which the crosspin 20 is moved to twist it into locking position, a flat portion 70 on which the crosspin 20 rests when in a locking position, and an abutment portion 72 which defines a limit position of the crosspin 20. A detent clip 74 secured to the underside of the base 60 maintains the crosspin 20 in a locking position on the flat portion of the cam tracks 66. The detent clip has a central opening 76 for accepting the shaft 12 of the fastener 10 and is provided with a pair of detents 78 for maintaining the crosspin 20 in a locking position against the flat portion 70 and the abutment portion 72 of the cam tracks 66. Adjustment screw 26, shown in an unadjusted position on FIGS. 1 to 3, is adjusted as shown in FIG. 7 so that the flange 54 abuts the spring retainer 48 when the fastener is turned to a locking position in the receptacle 58.

Referring now to FIGS. 8 and 9, in an alternative embodiment of my invention, rather than using coil spring 46 to move the fastener 10 to its retracted position, I employ a leaf spring, indicated generally by the reference character 80, in the shape of a bow, having legs 82 and 84 with respective loops 86 and 88 at the ends thereof bearing against the outer surface of panel 34. An enlarged central portion 90 of the spring 80 is formed with an opening 92 for receiving shaft 12 with the portion 90 engaging the underside of flange 54.

In use of my self-retracting, self-aligning fasteners in the usual installation a plurality of fasteners 10 are carried in spaced relationship on the panel 34 for cooperation with a plurality of correspondingly spaced receptacle 58 on the frame 36. Prior to the initial assembly of the panel 34 on the frame, all of the fasteners 10 are rotated to positions at which the crosspins 20 thereof drop into the gasket openings under the action of the associated springs 46 or 80. It will be appreciated that in this position of the fasteners portions of the shafts 12 extend downwardly below the lower surface of gasket 38. Now the panel 34 is moved into cooperative relationship with the frame 36 so that the fasteners 10 can be moved into cooperative relationship with the receptacles 58. It will readily be appreciated that the portions of the shafts 12 extending downwardly below the underside of gasket 38 serve as locating or pilot pins to ensure that the parts are properly aligned. Next the fasteners are move axially against the action of the springs 46 or 80 and are rotated through a quarter-turn to lock the fasteners in the receptacles. In the form of my invention shown in FIGS. 1 to 7 in this relative position of the parts flanges 54 abut the upper edges of walls 52 so that springs 46 are completely housed. Moreover, in this form of my invention the position of crosspins 20 can be adjusted by screws 26.

The panel 34 can be removed from the frame by reversing the fastening operation described above. As this is done crosspins 20 automatically drop into the gasket openings. Thus upon the next and succeeding operations of fixing the panel to the frame the fasteners are automatically aligned and are housed so that the operation of reassembling the panel on the frame is greatly facilitated and is readily achieved without danger of damaging the gasket. Such damage otherwise might result from securing a number of the panel fasteners while the crosspin of one or more of the other fasteners is out of its recess.

It will be seen that I have accomplished the objects of my invention. I have provided a fastener assembly which automatically retracts the locking element to a housed position when the members are unfastened to prevent possible damage to sealing gaskets or mating surfaces. My fastener assembly prealigns the locking element prior to insertion in the mating receptacle, thus providing a true quarter-turn fastener. Finally, my fastener assembly serves as a guide pin for aligning the members to be fastened. It is especially useful in installations wherein a multiplicity of fasteners are employed.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A fastener-and-receptacle assembly including in combination a first member having opposed sides and an aperture extending between said sides, a fastener having a shaft extending through said aperture, a locking element extending generally radially outwardly from said shaft on one side of said member and beyond the edge of said aperture to prevent said element from passing through said aperture, said member having portions defining a recess on said one side capable of completely receiving said locking element, said portions restraining said element from rotary movement when in said recess, means for biasing said locking element in such a direction and over such a range as to urge said element completely into said recess when said element is aligned therewith, said locking element being movable axially out of said recess to an extended position, the end of the shaft on said one side of said first member extending outwardly from said recess when said locking element is urged therein by said biasing means, a second member, a receptacle carried by said second member, said receptacle having an entry opening with a configuration corresponding generally to that of said recess, said first and second members being relatively movable to bring said fastener and said receptacle into register, said receptacle entry opening accepting said locking element when moved axially from an aligned position in said recess toward said extended position, and means on said receptacle responsive to rotary movement of said element from said aligned position for retaining said locking element in said extended position when rotated from said aligned position, wherein said biasing means further comprises an annular retainer disposed around said shaft between said first member and said biasing means.

2. An assembly as in claim 1 in which said shaft has a head on the opposite side of said first member from said locking element, said biasing means comprising a helical compression spring disposed around said shaft between said first member and said head.

3. An assembly as in claim 1 in which said annular retainer comprises a base and an outer cylindrical wall extending away from said base, said spring being disposed within said cylindrical wall, said cylindrical wall having such a diameter and axial extent that the head abuts the cylindrical wall when pressed toward said wall.

4. An assembly as in claim 1 in which said biasing means comprises a leaf spring.

5. An assembly as in claim 1 in which said locking element comprises diametrically opposed portions extending generally outwardly radially from said shaft.

6. A fastener-and-receptacle assembly including in combination a first member having opposed sides and a plurality of apertures extending between said sides, a plurality of fasteners having shafts extending respectively through said apertures, respective locking elements extending generally radially outwardly from said shafts on one side of said member and beyond the edges of said apertures to prevent said elements from passing through said apertures, said member having portions defining a plurality of recesses on said one side capable of completely receiving said locking elements, said portions restraining said elements from rotary movement when in said recesses, means for biasing said locking elements in such a direction and over such a range as to urge said elements completely into said recesses when said elements are aligned therewith, said locking elements being movable axially out of said recesses to extended positions, the ends of the shafts on said one side of said first member extending outwardly from said recesses when said locking elements are urged therein by said biasing means, a second member, a plurality of receptacles corresponding to said plurality of fasteners carried by said second member, said receptacles having entry openings with configurations corresponding generally to those of said recesses, said first and second members being relatively movable to bring said fasteners and said receptacles into register, said receptacle entry openings accepting said respective locking elements when moved axially from aligned positions in said recesses toward said extended positions, and means on said receptacles responsive to rotary movement of said elements from said aligned positions for retaining said locking elements in said extended positions when rotated from said aligned positions, wherein said biasing means further comprises an annular retainer disposed around said shaft between said first member and said biasing means.

* * * * *